United States Patent [19]

Klingensmith

[11] Patent Number: 4,822,871

[45] Date of Patent: Apr. 18, 1989

[54] POLYMERIZATION PROCESS

[75] Inventor: G. Bruce Klingensmith, Houston, Tex.

[73] Assignee: Shell Oil Company, Houston, Tex.

[21] Appl. No.: 134,677

[22] Filed: Dec. 18, 1987

[51] Int. Cl.$^4$ .............................................. C08G 67/02
[52] U.S. Cl. .................... 528/392; 525/191; 525/240; 525/242; 525/245; 525/248; 525/255; 525/262; 525/267
[58] Field of Search ............... 525/191, 240, 242, 245, 525/248, 255, 262, 267, 392

[56] References Cited

U.S. PATENT DOCUMENTS

| | | | |
|---|---|---|---|
| 3,689,460 | 9/1972 | Nozaki | 260/63 |
| 3,694,412 | 9/1972 | Nozaki | 260/63 |
| 4,195,184 | 3/1980 | Kesling, Jr. et al. | 560/207 |

FOREIGN PATENT DOCUMENTS

| | | |
|---|---|---|
| 0121965 | 10/1984 | European Pat. Off. . |
| 0181014 | 5/1986 | European Pat. Off. . |
| 1081304 | 8/1967 | United Kingdom . |

*Primary Examiner*—John Kight
*Assistant Examiner*—Samuel A. Acquath

[57] ABSTRACT

A linear alternating polymer of carbon monoxide and at least one ethylenically unsaturated hydrocarbon exhibits improved thermal stability as evidenced by reduced weight loss at elevated temperatures and enhanced crystallinity and crystallizability when produced with a catalyst composition formed from preformed palladium trifluoroacetate and a bidentate phosphine ligand.

4 Claims, No Drawings

POLYMERIZATION PROCESS

SUMMARY OF THE INVENTION

This invention relates to an improved method of producing linear alternating polymers of carbon monoxide and at least one ethylenically unsaturated hydrocarbon. More particularly, the invention relates to a process for the production of polyketone polymers of improved properties in a reaction environment substantially free from strong acid.

BACKGROUND OF THE INVENTION

The class of polymers of carbon monoxide and olefin(s) has been known for a number of years. Brubaker, U.S. Pat. No. 2,495,286 produced such polymers in the presence of free radical catalysts, i.e, peroxy compounds. U.K. No. 1,081,304 produced similar polymers of higher carbon monoxide content in the presence of alkylphosphine complexes of palladium salts as catalyst. Nozaki extended this process through the use of arylphosphine complexes of palladium salts and certain inert solvents, e.g., U.S. Pat. No. 3,694,412.

More recently the class of linear alternating polymers of carbon monoxide and at least one ethylenically unsaturated hydrocarbon, e.g., ethylene or ethylene and propylene, has become of greater interest, in part because of the greater availability of these polymers. The polymers have been shown to be of the formula $-CO(A)-$ where A is the moiety of the unsaturated hydrocarbon polymerized through the ethylenic unsaturation. For example, when the ethylenically unsaturated hydrocarbon is ethylene, the polymer is represented by the formula $-CO(-CH_2-CH_2)-$. The general process for the production of such polymers is illustrated by a number of published European patent applications including No. 0,121,965 and No. 0,181,014. The process generally involves a catalyst composition formed from a compound of the Group VIII metals palladium, cobalt or nickel, the anion of a nonhydrohalogenic acid having a pKa below 2 and a bidentate ligand of phosphorus, arsenic or antimony.

The resulting polymers are relatively high molecular weight thermoplastics having utility in the production of shaped articles such as containers for food and drink and parts for the automotive industry. The polymers are characterized by relatively high melting points, generally over 175° C., frequently over 210° C., depending upon the molecular weight and the chemical nature of the polymer. During processing of these polymers, the polymer is often heated to temperatures near or above the melting point and maintained at such temperatures for times which vary with the nature of the thermal processing. Although the polymer is relatively stable at such temperatures, it will undergo some thermal degradation as will many polymers of that general type. The degradation is most easily evidenced by loss of weight on standing at elevated temperatures in air or even in inert gases such as nitrogen. It would be of advantage to provide a polyketone polymer of enhanced thermal stability as evidenced by reduced weight loss when maintained at elevated temperatures. It would also be of advantage to provide a polyketone polymer of enhanced crystallinity and crystallizability.

SUMMARY OF THE INVENTION

This invention relates to an improved method of producing linear alternating polymer of carbon monoxide and at least one ethylenically unsaturated hydrocarbon. More particularly, a linear alternating polyketone polymer of enhanced thermal stability, crystallinity, and crystallizability is produced when the palladium compound and the anion of a strong nonhydrohalogenic acid components of a polyketone polymerization catalyst are provided as in the form of a pre-formed compound and specifically as palladium trifluoroacetate. In the present method, polymerization in the presence of an excess of strong acid which can promote undesired reactions is avoided.

DESCRIPTION OF THE INVENTION

The polymers which are produced according to the invention are the linear alternating polymers of carbon monoxide and at least one ethylenically unsaturated hydrocarbon often referred to as polyketones. Suitable ethylenically unsaturated hydrocarbons for use as precursors of the polyketones have from 2 to 20 carbon atoms inclusive, preferably from 2 to 10 carbon atoms inclusive, and are aliphatic such as ethylene and other α-olefins including propylene, 1-butene, 1-octene and 1-docecene, or are arylaliphatic containing an aryl substituent on an otherwise aliphatic molecule, particularly an aryl substituent on a carbon of the ethylenic unsaturation. Illustrative of this latter class of ethylenically unsaturated hydrocarbons are styrene, p-methylstyrene, p-ethylstyrene and m-methylstyrene. Preferred polyketone polymers are copolymers of carbon monoxide and ethylene or terpolymers of carbon monoxide and ethylene and a second α-olefin, particularly propylene.

The structure of the preferred polymers is that of a linear alternating polymer of carbon monoxide and ethylenically unsaturated hydrocarbon and the polymer will contain substantially one molecule of carbon monoxide for each molecule of the hydrocarbon. When termpolymers of carbon monoxide, ethylene and a second ethylenically unsaturated hydrocarbon, i.e., a hydrocarbon of at least 3 carbon atoms, are produced there will be at least 2 units incorporating a moiety of ethylene per unit incorporating a moiety of the second hydrocarbon, preferably from about 10 to about 100 units incorporating a moiety of ethylene per unit incorporating a moiety of the second hydrocarbon. The polymer chain is therefore illustrated by the formula

where B is the moiety obtained by polymerization of the second ethylenically unsaturated hydrocarbon through the ethylenic unsaturation. The $-CO-(CH_2-CH_2)-$ units and the $-CO-(B)-$ units are formed randomly throughout the polymer chain and the ratio of y:x is no more than about 0.5. In the modification of the invention which produces copolymers of carbon monoxide and ethylene without the presence of a second hydrocarbon, the polymers are represented by the above formula wherein y=0. When y is other than 0, i.e., terpolymers are produced. Ratios of y:x from about 0.01 to about 0.1 are preferred. The end groups or "caps"0 of the polymer chain will depend upon what materials are present during the production of the polymer and whether and how the polymer has been purified. The precise nature of the end groups may change according to the method of preparation or purification of the polymer but the polymer is fairly represented in terms of the polymer chain as depicted above.

Of particular interest are the polymers of molecular weight are about 1,000 to about 200,000, particularly those of molecular weight from about 10,000 to about 50,000 containing substantially equimolar quantities of carbon monoxide and unsaturated hydrocarbon. The physical properties of such polyketone polymers depend in part on the molecular weight of the polymer, whether the polymer is a copolymer or a terpolymer and the relative proportion of any second hydrocarbon present in the case of a terpolymer. Typical melting points of such polymers are from about 175° C. to about 300° C. and more frequently from about 210° C. to about 270° C.

A method of producing polyketone polymers which is now becoming conventional is to contact the carbon monoxide and unsaturated hydrocarbon(s) with a catalyst composition formed from a palladium salt, preferably a palladium carboxylate such as palladium acetate, the anion of a non-hydrohalogenic acid having a pKa below about 6, preferably below about 2, for example the anion of trifluoroacetic or p-toluenesulfonic acid, and a bidentate phosphorus ligand of defined structure. Such a process for polyketone production is illustrated by copending U.S. patent applications Ser. No. 908,899, filed Sept. 18, 1986 and Ser. No. 930,468, filed Nov. 14, 1986. The processes generally employ a stoichiometric excess of anion over the palladium compound and typically a ratio of anion to palladium of about 20:1. Although the above co-pending applications do disclose that the palladium salt of the catalyst composition is suitably added as a single compound such as palladium p-toluenesulfonate and acetonitrile complexes thereof, rather than formed in-situ from, e.g., palladium acetate and excess p-toluenesulfonic acid, there are no advantages attributed to the provision of the palladium and the anion catalyst composition precursors in the form of a single compound and there is no description of that single compound being palladium trifluoroacetate.

The present invention contemplates a catalyst composition formed from palladium trifluoroacetate, provided as a preformed material, and a bidentate liquid of phosphorus as defined herein. Use of the catalyst composition of the invention results in production of a polymer of enhanced thermal stability, and reduced weight loss when maintained at elevated temperatures and enhanced crystallinity and crystallizability. Through the use of a preformed salt of palladium and the trifluoroacetic anion, the substantial presence of excess strong acid is avoided. While the conventional procedures wherein excess strong acid may be present result in excellent yields of polyketone polymer, the process of the invention where strong acid is substantially absent results in polymer product which exhibits improved thermal stability and reduced weight loss at elevated temperatures, and enhanced crystallinity and crystallizability.

The phosphine ligand of the process of the invention is a bis(diphosphino)alkane wherein each monovalent phosphorus substituent is an aromatic radical of up to 10 carbon atoms. The preferred ligands are represented by the formula

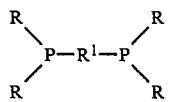

wherein R independently is aryl including alkaryl and is hydrocarbyl or is substituted hydrocarbyl wherein any non-hydrocarbyl substituents are alkoxy. Illustrative R groups are therefore phenyl, p-tolyl, xylyl, p-methoxyphenyl, p-propylphenyl, o-methoxyphenyl, 2,4-dimethoxyphenyl, o-ethoxyphenyl and m-butoxyphenyl. The R groups are the same or are different, but in the preferred phosphine ligands the R groups are the same and are unsubstituted (except for hydrogen) phenyl or are phenyl substituted with an alkoxy group in a position ortho to the phosphorus. The $R^1$ group is a divalent bridging group of from 2 to 10 carbon atoms inclusive and preferably contains from 2 to 4 carbon atoms in the bridge connecting the phosphorus atoms. The preferred $R^1$ group is the trimethylene group, i.e., the —CH$_2$—CH$_2$—CH$_2$— group.

Illustrative of preferred bidentate phosphorus ligands are 1,3-bis[di-(2-methoxyphenyl)phosphino]propane, 1,3-bis[di(2,4-diethoxyphenyl)phosphino]propane and 1,3-bis(diphenylphosphino)propane. The latter 1,3-bis(diphenylphosphino)propane is particularly preferred.

The bidentate phosphorus ligand is generally employed in a quantity from about 0.1 mol to about 5 mol per mol of palladium trifluoroacetate, preferably in a quantity from about 0.5 mol to about 1.5 mol per mol of palladium trifluoroacetate. The quantity of the catalyst to be employed will be a catalytic quantity. Amounts of catalyst are typically sufficient to provide from about $1 \times 10^7$ mol to about $1 \times 10^{-3}$ mol of palladium per mol of unsaturated hydrocarbon to be polymerized, preferably from about $1 \times 10^{-6}$ mol to about $1 \times 10^{-3}$ mol of palladium per mol of ethylenically unsaturated hydrocarbon. The molar ratio of ethylenically unsaturated hydrocarbon to carbon monoxide to be utilized in the polymerization mixture will be from about 10:1 to about 1:5 but preferably will be from about 5:1 to about 1:2.

The reactants and catalyst composition are contacted in a reactor such as an autoclave where conditions of elevated temperature and pressure may be maintained. The mechanical nature of the reactor is not critical but best results are obtained if reactant-catalyst contact is promoted as by shaking or stirring.

Polymerization is conducted under polymerization conditions in the gaseous phase or in a liquid phase in an inert diluent such as a lower alkanol, e.g., methanol or ethanol. Suitable reaction temperatures are from about 20° C. to about 115° C. with preferred temperatures being from about 75° C. to about 110° C. Typical reaction pressures are from about 100 psi to about 3000 psi with pressures from about 600 psi to about 1500 psi being preferred. Subsequent to reaction, the polymer product is recovered by conventional means including filtration or decantation. The polymer product may contain residues of the catalyst which are removed if desired by contact with a solvent which is selective for the residues.

The polymer product is characterized by a relatively high heat stability as evidenced by a relatively low weight loss upon being maintained at elevated temperatures. The property of heat stability is a function of a number of variables including molecular weight, but when a polymer of the invention is compared with a polymer of comparable molecular weight produced by, for example, the process of published European patent application No. 0,181,014, the present polymer will exhibit an increased heat stability as evidenced by a reduced weight loss upon heating. Although the advantage of thermal stability is most apparent by comparison of a polymer produced according to the invention with a polymer of similar molecular weight produced by conventional methods, the polymers of the invention typically exhibit a weight loss of no more than about 7.5% in air and no more than about 3.4% in nitrogen when maintained at 210° C. for a period of 2 hours.

The polymer product also shows a relatively high crystallinity and crystallizability as evidenced by differential scanning calorimeter (DSC) measurements of melting point and crystallization temperature. Typically the melting point, Tm, will be higher than the crystallization temperature, Tc. Although a number of factors influence the melting point and crystallization temperature, these values are also influenced by the crystallinity and the crystallizability of the polymer. In general, when comparing similar polyketone polymers of comparable molecular weight, the higher the melting point and the higher the crystallization temperature, the greater the crystallinity and crystallizability of the polymer. The same relationship is especially true for the heats of melting (H) and the heats of crystallization (C).

The polymers of the present invention typically show an equivalent or higher Tm and a higher Tc in DSC measurements than polymers of comparable molecular weight produced by conventional methods. Correspondingly, the polymers of the present invention show an equivalent or higher heat of fusion, H, and a higher heat of crystallization, C, than polymers of comparable molecular weight produced by conventional methods. This enhanced crystallinity and crystallizability of the polymers of the present invention, in comparison to conventionally produced polymers, is also evident in repeated heating and cooling DSC cycles.

The polyketone polymers of the present invention are in general premium thermoplastics of established utility. The polymer produced according to the present invention has particular utility in applications where the polymer processing is likely to involve temperatures at or near the melting point of the polymer. Such applications include the production of containers for food and drink as by thermoforming, the production of shaped parts for the automotive industry produced as by injection molding and the production of wires and cables produced as by extrusion.

The invention is further illustrated by the following Illustrative Embodiments and Comparative Example (not of the invention) which should not be construed as limiting the invention.

COMPARATIVE EXAMPLE

A sample of a linear alternating copolymer was produced by a conventional method employing a catalyst composition formed from palladium acetate, trifluoroacetic acid and 1,3-bis(diphenylphosphino)propane. The molar ratio of trifluoroacetic acid to palladium acetate was 20:1 and the molar ratio of the diphosphine to palladium acetate was 1.2:1. In a typical experiment, 0.046 mmol of palladium acetate, 0.92 mmol of trifluoroacetic acid and 0.055 mmol of 1,3-bis(diphenylphosphino)propane in 27.6 ml of methanol were charged to an autoclave in methanol as a reaction diluent. Carbon monoxide and ethylene were introduced in a molar ratio of 2:1 and the reactor and contents were maintained at 65° C. and 725 psi for 23 hours. The reactor was then cooled and the pressure released. The polymer product was removed from the reactor, washed with methanol and dried in vacuo. This product, termed "Sample A" had a limiting Viscosity Number (LVN), measured in hexafluoroisopropanol at 100° C. of 2.65.

ILLUSTRATIVE EMBODIMENT I

Samples of linear alternating copolymer of carbon monoxide and ethylene were produced according to the invention employing a catalyst composition formed from preformed palladium trifluoroacetate and 1,3-bis(diphenylphosphino)propane. The molar ratio of the diphosphine to palladium compound was 1.2:1. In a typical experiment, 0.046 mmol of palladium trifluoroacetate and 0.055 mmol of 1,3-bis(diphenylphosphino)propane in 27.6 ml of methanol were introduced to a stirred autoclave containing methanol as the reaction medium and carbon monoxide and ethylene were added in a 2:1 molar ratio. The reactor and contents were maintained for 16 hours at 55° C. and 950 psi. The reactor was then cooled and the pressure released. The polymer product was removed by filtration, washed with methanol and dried in vacuo. This sample, termed "Sample B" had a LVN of 2.65, as measured in hexafluoroisopropanol at 100° C.

ILLUSTRATIVE EMBODIMENT II

The samples A and B as produced above were subjected to isothermal gravametric analysis (TGA) to determine stability in air and also in nitrogen under conditions of elevated temperature. In these determinations, a DuPont 9900 instrument was used. The samples were heated rapidly to 210° C. in air and also in nitrogen and the weights of the samples were determined as a function of time over a period of two hours. The results of the determinations are shown in Table I wherein Samples A and B were produced according to the above procedures and Samples $B_1$ and $B_2$ were produced according to the general procedure of Illustrative Embodiment I.

TABLE I

| Sample | Loss in Air, %/hr | Loss in $N_2$, %/hr | Loss in Air, Total, % | Loss in $N_2$, Total, % |
|---|---|---|---|---|
| A | 0.023 | 0.0033 | 8.01 | 5.09 |
| A | 0.024 | 0.0029 | 8.31 | 3.45 |
| B | 0.0047 | 0.00093 | 2.98 | 1.52 |
| $B_1$ | 0.0064 | 0.0018 | 2.94 | 3.15 |
| $B_2$ | 0.0090 | 0.0013 | 5.80 | 3.28 |

ILLUSTRATIVE EMBODIMENT III

Measurements of melting points (Tm) and crystallization temperatures (Tc), or alternatively heats of melting (H) and heats of crystallization (C), for the polymer Samples A and B of the Comparative Example and of Illustrative Embodiment I were made by the use of a Perkin-Elmer DSC 7 differential scanning calorimeter (DSC) which employs samples of polymer or polymer composition in sealed pan containers. The pan and contents are heated at a controlled rate, typically 20° C./minute, until the sample has melted. The pan and contents are then cooled until the sample has solidified and then heated, past a second melting point, to 285° C. at which temperature the sample is maintained for 10 minutes. The pan and contents are then cooled until the sample has solidified a second time. The melting and crystallization temperatures are defined as the temperatures at which the heat flow reaches a maximum (for melting) or a minimum (for crystallization).

The smaller the difference between the first and second heats of melting, the greater the degree of retained crystallinity. The same relationship is true for the first and second heats of crystallization. The higher the degree of retained crystallinity the better the melt stability of the composition.

The results of the DSC measurements for Samples A and B are shown in Table II. In Table II, temperatures are measured in °C. and heats are measured in cal/g.

TABLE II

| Sample | $TM_1$ | $Tc_1$ | $TM_2$ | $Tc_2$ | $H_1$ | $H_2$ | $C_1$ | $C_2$ |
|---|---|---|---|---|---|---|---|---|
| B | 260.8 | 198.9 | 246.7 | 180.0 | 36.6 | 30.0 | 24.2 | 18.0 |
| A | 251.9 | 184.8 | 238.0 | 156.9 | 37.4 | 23.7 | 19.9 | 12.5 |

ILLUSTRATIVE EMBODIMENT IV

When a linear alternating terpolymer of carbon monoxide, ethylene and propylene is produced employing a catalyst composition formed from palladium trifluoroacetate and 1,3-bis[di(4-methoxyphenyl)]propane, the polymer will show thermal stability as evidenced by a low weight loss when maintained at elevated temperatures.

What is claimed is:

1. In the process of producing linear alternating polymer of carbon monoxide and at least one ethylenically unsaturated hydrocarbon in the presence of a catalyst composition formed from a palladium compound, the anion of trifluoroacetic acid and a bidentate phosphine ligand, the improvement which comprises providing the palladium compound and trifluoroacetate anion as preformed palladium trifluoroacetate.

2. In the process of producing the linear alternating polymer of carbon monoxide and at least one ethylenically unsaturated hydrocarbon represented by the formula

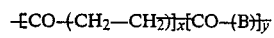

wherein B is a moiety of ethyenically unsaturated hydrocarbon of at least 3 carbon atoms and up to 10 carbon atoms and the ratio of y:x is up to about 0.5, in the presence of a catalyst composition formed from a palladium compound, the anion of trifluoroacetic acid and a bidentate phosphine ligand, the improvement which comprises providing the palladium compound and the trifluoroacetate anion as preformed palladium trifluoroacetate.

3. The process of claim 2 wherein y=0.

4. The process of claim 2 wherein B is a moiety of propylene and the ratio of y:x is from about 0.01 to about 0.1.

* * * * *